(12) United States Patent
Karlecik-Maier

(10) Patent No.: US 7,729,138 B2
(45) Date of Patent: Jun. 1, 2010

(54) CONTROL METHOD FOR DIRECT-CURRENT TRANSMISSION

(75) Inventor: Franz Karlecik-Maier, Höchstadt (DE)

(73) Assignee: Siemens Aktiengesellschaft, Munich (DE)

( * ) Notice: Subject to any disclaimer, the term of this patent is extended or adjusted under 35 U.S.C. 154(b) by 157 days.

(21) Appl. No.: 12/067,820

(22) PCT Filed: Sep. 22, 2005

(86) PCT No.: PCT/DE2005/001709

§ 371 (c)(1),
(2), (4) Date: Mar. 24, 2008

(87) PCT Pub. No.: WO2007/033620

PCT Pub. Date: Mar. 29, 2007

(65) Prior Publication Data

US 2008/0212342 A1    Sep. 4, 2008

(51) Int. Cl.
*H02M 5/45* (2006.01)
(52) U.S. Cl. .......................................... 363/37; 363/51
(58) Field of Classification Search .................. 363/35, 363/37, 51, 78, 79, 85
See application file for complete search history.

(56) References Cited

U.S. PATENT DOCUMENTS

| 4,019,115 A | * | 4/1977 | Lips ............................ 363/65 |
| 4,264,951 A | | 4/1981 | Konishi et al. |
| 4,320,444 A | | 3/1982 | Hausler et al. |
| 4,996,646 A | * | 2/1991 | Farrington ................... 700/293 |
| 5,831,841 A | * | 11/1998 | Nishino ........................ 363/37 |
| 5,920,467 A | * | 7/1999 | Bowyer et al. ................. 363/37 |

FOREIGN PATENT DOCUMENTS

| DE | 2901263 A1 | 7/1980 |
| DE | 19544777 C1 | 12/1996 |
| EP | 0087640 A2 | 9/1983 |
| EP | 0688081 A1 | 12/1995 |

OTHER PUBLICATIONS

International Search Report dated May 26, 2006.
European Office Action dated Jul. 31, 2009.

* cited by examiner

*Primary Examiner*—Adolf Berhane
(74) *Attorney, Agent, or Firm*—Laurence A. Greenberg; Werner H. Stemer; Ralph E. Locher

(57) ABSTRACT

In a method for controlling a rectifier and an inverter, which are connected together by a direct current circuit, a measuring direct current voltage and respectively, a measuring direct current are measured at at least one measuring point of the direct current circuit and are transmitted to a direct current control for controlling the rectifier and/or an inverter control for controlling the inverter. The direct current control controls the rectifier in such a manner that a total of a difference direct current voltage and a differential direct current is minimal and the inverter control of the inverter is controlled in such a manner that the difference between the differential direct current of the differential direct current voltage is minimal. The method is reliable and is economical. Accordingly, the desired flow of the direct current control and the desired flow of the inverter control are identical.

11 Claims, 6 Drawing Sheets

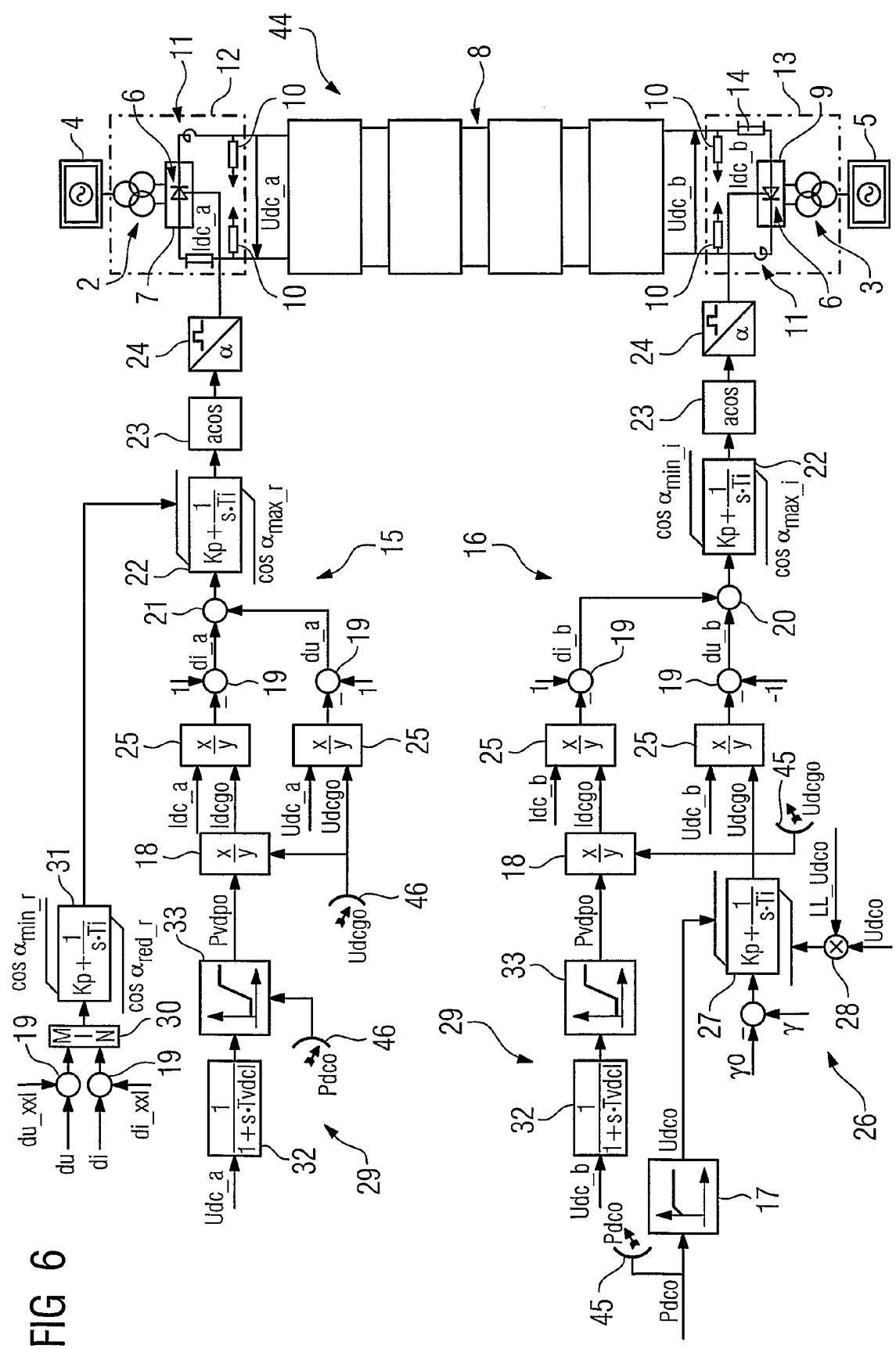

CONTROL METHOD FOR DIRECT-CURRENT TRANSMISSION

BACKGROUND OF THE INVENTION

Field of the Invention

The present invention relates to a method for controlling a rectifier and an inverter which are connected to one another via a DC circuit, in the field of power distribution and transmission, in which a measured DC voltage and a measured direct current are in each case measured at at least one measurement point in the DC circuit, and are passed to a rectifier control system in order to control the rectifier, and/or to an inverter control system in order to control the inverter, with the rectifier control system and the inverter control system each forming the difference between a predetermined nominal DC voltage and the respectively received measured DC voltage, resulting in a difference DC voltage and, furthermore, the difference between a nominal direct current and the respectively received measured direct current resulting in a difference direct current, with the difference DC voltage and the difference direct current being in a normalized form and with the rectifier control system controlling the rectifier such that the sum of the difference DC voltage and the difference direct current is minimized, and with the inverter control system controlling the inverter such that the difference between the difference direct current and the difference DC voltage is minimized, A method such as this is already known from DE 195 44 777 C1. The method described there is used to control a so-called high-voltage direct-current transmission installation, which comprises a plurality of converters, in which case the converters can be selectively operated as inverters or rectifiers. In this case, the converters are connected to one another via a direct-current link. Transformers are provided in order to couple the converter to a respectively associated power distribution system. The rectifier or inverter is controlled by recording the direct currents and DC voltages at the respective converters as measurement variables. Furthermore, nominal value pairs in the form of a nominal current and nominal voltage are defined for each converter. Each control system calculates a control discrepancy relating to this, that is to say in other words forms the difference between the measured values and nominal values. The rectifier is controlled such that the sum of the control discrepancies is minimized. In contrast, the inverter is controlled such that the difference between the control discrepancies is minimized. The already known method has the disadvantage that a higher control system level is required. However, a hierarchical control system structure is complex and can lead to undesirable instabilities.

A method which is referred to in EP 0 087 640 B1 as marginal current is used to control a high-voltage direct-current transmission installation which comprises an inverter and a rectifier, with the inverter and the rectifier being connected to one another via a DC circuit. The rectifier is connected to a power-supplying AC voltage power supply system via a transformer, with the inverter being coupled by a further transformer to an AC voltage power supply system that is to be supplied. The so-called marginal current method is used to control the rectifier and/or the inverter. For this purpose, a measured DC voltage and a measured direct current are in each case measured both on the rectifier and on the inverter, and the measured measurement variables are transmitted to a rectifier control system or to an inverter control system, respectively. The inverter control system has a gamma control system, a voltage control system and a marginal-current control system, with these control systems competing with one another, by use of suitable control system substitutions. The use of different control systems based on control system substitution can, however, lead to undesirable instabilities.

BRIEF SUMMARY OF THE INVENTION

The object of the present invention is therefore to provide a method of the type mentioned initially which has a good dynamic response and at the same time operates in a reliable and stable manner.

The invention achieves this object by the nominal current in the rectifier control system and the nominal current in the inverter control system being identical.

The invention avoids not only the control method having a hierarchical structure but also selection of minima or maxima to define the fundamental control system. Instead of this, for the purposes of the invention, a specific operating point is used in a coordinated manner, which also makes it possible to take account of those requirements which are governed predominantly by the AC voltage power supply systems. Current and voltage control are combined in the control method according to the invention. Within the rectifier control system, this is done by addition of a normalized difference DC voltage with a normalized difference direct current. The resultant sum is, finally, supplied to the actual control unit for the rectifier. Instead of this, for the inverter, the difference between the difference direct current and the difference DC voltage is formed, and this is passed to the control unit. It should be noted that the measured values are recorded, for example, by means of current transformers and voltage transformers, respectively, whose output signal is respectively proportional to a monitored DC voltage, for example 500 kV, or a direct current driven as a result of this DC voltage, for example 3000 A. The output signal from the current transformer or from the voltage transformer is finally sampled by means of a sampling unit resulting in sample values, and the sample values are converted by an analog/digital converter to digital measured values. In other words, the measured DC voltage and the measured direct current are, for example, digital measured values which are supplied to the respective control system, and are processed further by its software.

According to the invention, and in contrast to the prior art, the nominal current in the rectifier control system and the nominal current in the inverter control system are identical. In one expedient further development of the invention, the nominal voltage in the rectifier control system and the nominal voltage in the inverter control system are identical. The respective nominal value or values is or are related to any given electrical point in the DC circuit. The invention avoids the need for a higher control system level such as that in the already known marginal current methods, and therefore avoids a hierarchical control system structure. The voltage difference which is dropped across the DC circuit between the rectifier and the inverter is automatically set for the purposes of the present invention. This automatic setting has immense advantages over already known methods with an additional higher-level control system. The control system within the scope of the invention is therefore simpler and more reliable than that from the prior art.

The nominal current and/or nominal voltage are in a normalized form and, for example, are related to rated values for this purpose.

The nominal voltage and the nominal current are advantageously determined from a common nominal DC power. This nominal DC power may, for example, be related to an imaginary virtual electrical center of the DC circuit.

The rectifier and the inverter are advantageously controlled over the entire operating range of the rectifier and of the inverter, respectively, both on the basis of the difference direct current di and on the basis of the difference dc voltage du. There is no need for regulation at the sum or the difference of the difference direct current and difference DC voltage in the normal way when using this expedient further development. Control substitution is therefore avoided, and the stability of the method is further enhanced.

The rectifier and the inverter are advantageously located physically alongside one another, with the measured DC voltage and the measured direct current being recorded at one measurement point and being transmitted both to the rectifier control system and to the inverter control system. In this advantageous further development, the current and voltage values at the inverter and at the rectifier are virtually identical, so that measured values need be recorded at only one measurement point. The recorded measured direct current and the recorded measured DC voltage are transmitted both to the rectifier control system and to the inverter control system, where they are processed further.

In a further development of the invention which differs from this, the rectifier and the inverter are installed at least one kilometer away from one another forming a direct-current transmission installation, with the measured DC voltage and the measured direct current being recorded on the one hand at the rectifier, resulting in a rectifier measured DC voltage and a rectifier measured direct current and on the other hand at the inverter, resulting in an inverter measured DC voltage and an inverter measured direct current, with the rectified measured DC voltage and the rectifier measured direct current being transmitted to the rectifier control system, and the inverter measured DC voltage and the inverter measured direct current being transmitted to the inverter control system. This further development of the method according to the invention allows long-distance transmission of electrical power as a traditional field of application for a direct-current transmission installation. In this case, the inverter and the rectifier are generally installed separated from one another by several hundred kilometers and are connected to one another via a DC circuit of appropriate length. The DC circuit normally has a smoothing conductor for smoothing the direct current. This allows power to be transmitted over relatively long distances, with low losses. In this case, the measured direct currents and measured DC voltages required for control purposes are recorded at various measurement points, specifically on the one hand at or in the vicinity of the inverter, and on the other hand at the rectifier or in its vicinity. For the purposes of the invention, the measurement point does not mean the precisely identical location to the actual recording point. For the purposes of the invention, the appliances for recording the current and voltage may in fact also be positioned several meters away from one another. The important factor, however, is that the operating variables which can be recorded at a measurement point are essentially identical, within the scope of measurement accuracy.

In the case of long-distance direct-current transmission carried out using the further development according to the invention, the respectively required nominal values, such as a nominal DC voltage, are transmitted from the inverter to the rectifier by means of long-distance data transmission means. Expedient long-distance data transmission means include both cable-based transmission means, for example the Internet, or communication via high-voltage lines, as well as transmission means that do not involve cables, such as radios or the like.

The rectifier and the inverter preferably each have a bridge circuit formed by thyristors. Thyristors operate with low losses in comparison to other power semiconductor valves and are used in particular for high-voltage direct-current transmission.

The nominal DC voltage and the nominal direct current are advantageously determined from the required nominal DC power. By way of example, they are determined using a function transmitter which defines a nominal voltage on the basis of the power, using a predetermined characteristic. The function transmitter characteristic is dependent on the basic structure of the entire apparatus for carrying out the method, that is to say the basic structure of the inverter of the rectifier and of the DC circuit, as is defined on the basis of empirical values. The nominal direct current is calculated from the nominal DC voltage, as defined by the function transmitter, by conventional division of the nominal DC power by the nominal DC voltage, with the difference DC voltage and the difference direct current then being formed, for example, by means of a simple adder. The advantage of this procedure is that the user just needs to state the desired transmission power, and the rest of the control process is then carried out automatically on the basis of this transmission power.

The measured direct current normalized with respect to a rated current and the measured DC voltage normalized with respect to a rated voltage are expediently renormalized with respect to the nominal direct current, likewise normalized with respect to the rated current, and, respectively, with respect to the nominal DC voltage, likewise normalized with respect to the rated voltage, with the difference direct current being calculated as the difference between unity and the measured direct current normalized with respect to the nominal direct current, and with the difference DC voltage being calculated as the difference between unity and the measured DC voltage normalized with respect to the nominal DC voltage. According to this advantageous further development, the values are renormalized without changing the required transmission power, that is to say the nominal DC power. This renormalization process results, in particular, in advantages when operating on low load. For example, in the case of the marginal current method according to the prior art, even in powerful AC voltage power supply systems, that is to say in AC voltage power supply systems with a high so-called short circuit ratio, the ratio of the power supply system short-circuit power to the rated power of the DC transmission installation, a disadvantageous control response occurs in the low load range. By way of example, a high short circuit ratio is 5. In contrast, the further development according to the invention allows rapid response for the desired operating points even in the low load range.

A measured turn-off angle is advantageously measured at the inverter and is transmitted to a gamma control system with the gamma control system comparing the measured turn-off angle with a nominal turn-off angle, and if the measured turn-off angle is less than the nominal turn-off angle, produces a DC voltage nominal value which is lower than the predetermined nominal DC voltage, with the inverter control system then regulating at the DC voltage nominal value. This further development of the invention results in a gamma control system in order to reliably avoid commutation faults during triggering of the converter valves in the inverter. However, in contrast to the prior art, this avoids competing control with the use of a choice of minima and maxima between a gamma control system and, for example, a current control system, for the purposes of the invention. According to the invention, the gamma control system is not used when the installation to be controlled is being operated normally. By way of example, a gamma regulator in the gamma control system is for this purpose locked to the nominal DC voltage set by a user of the method. For this purpose, the gamma regulator is limited, for example at the top, to this selected nominal DC power. If the selected nominal turn-off angle is undershot, the gamma regulator in contrast defines a nominal DC voltage which is less than the originally selected nominal DC voltage, and this is then used as the basis for further control. The gamma regulator expediently also has a lower control limit which ensures that the decreased nominal DC voltage does not fall below a lower threshold value.

A further advantageous further development of the invention has a limiting regulator which limits a rectifier regulator in the rectifier control system at the top, such that a predetermined maximum current and/or a predetermined maximum voltage are/is not exceeded. The limit, which occurs by way of example in the event of a malfunction, is used to protect the controlled installations and for additional stabilization of the method according to the invention.

According to one expedient further development relating to this, the limiting regulator limits the rectifier regulator when the measured direct current is greater than the sum of the nominal direct current and a predetermined difference direct-current discrepancy, or when the measured DC voltage is greater than the sum of the nominal DC voltage and a predetermined difference DC voltage discrepancy. The difference DC discrepancy and the difference voltage discrepancy make it possible to set any desired tolerance range, in which a discrepancy between the respective measured value and the associated nominal value is permissible without the limiting, as described further above, in the rectifier control system coming into action.

According to one expedient further development, when the measured DC voltage is falling, the nominal DC power is reduced as a function of the measured DC voltage to a lower value in order to produce a malfunction nominal DC power, with the nominal direct current and/or the nominal DC voltage being determined from the malfunction nominal DC power rather than from the nominal DC power. The nominal DC power is reduced in order to control the direct-current transmission installation in the event of a malfunction in which, for example, a voltage dip occurs in one of the AC voltage power supply systems or in the DC circuit.

According to one expedient further development in this context, the malfunction nominal DC power is defined using a function transmitter which is provided with a characteristic based on empirical values. In this case, the measured DC voltage is smoothed and is supplied to the function transmitter. The measured DC voltage generally needs to be smoothed since the measured DC voltage can fluctuate to a major extent in the event of a malfunction. The function transmitter produces a malfunction power limit as a function of the smooth measured DC voltage. This is expediently used to limit the output value of an integrator at the top, with the output value of the integrator being the malfunction nominal DC power. The output of the integrator is used to define the nominal DC voltage and the nominal direct current. During normal operation, the output value from the integrator is equal to the nominal DC power selected by the user, or in other words the malfunction action is inactive. If, in contrast, the measured DC voltage falls below a predetermined threshold value, the function transmitter produces a malfunction power limit which is less than the nominal DC power. Initially, this is then the output value from the integrator and thus at the same time the malfunction nominal DC power. If the smoothed measured DC voltage at the input to the function transmitter rises, it produces an increased malfunction power limit as the upper limit of the integrator. The integrator then integrates to the increased malfunction power limit at an integration rate which, for example, can be adjusted. In one preferred exemplary embodiment, the integration rate is made dependent on the nature and magnitude of the fluctuations in the measured DC voltage. In this case, the fluctuations in the measured DC voltage are used as an indication as to whether a given fault is still present or has already been overcome.

The method according to the invention is suitable both for high-voltage direct-current transmission, medium-voltage direct-current transmission and for low-voltage direct-current transmission.

Further expedient refinements and advantages of the invention are the subject matter of the following description of the exemplary embodiments of the invention with reference to the figures in the drawing, in which the same reference symbols refer to components having the same effect, and in which:

BRIEF DESCRIPTION OF THE SEVERAL VIEWS OF THE DRAWING

FIG. 6 shows a schematic illustration of a further exemplary embodiment of the method according to the invention for a high-voltage direct-current long-distance transmission installation.

DESCRIPTION OF THE INVENTION

Figure 1:
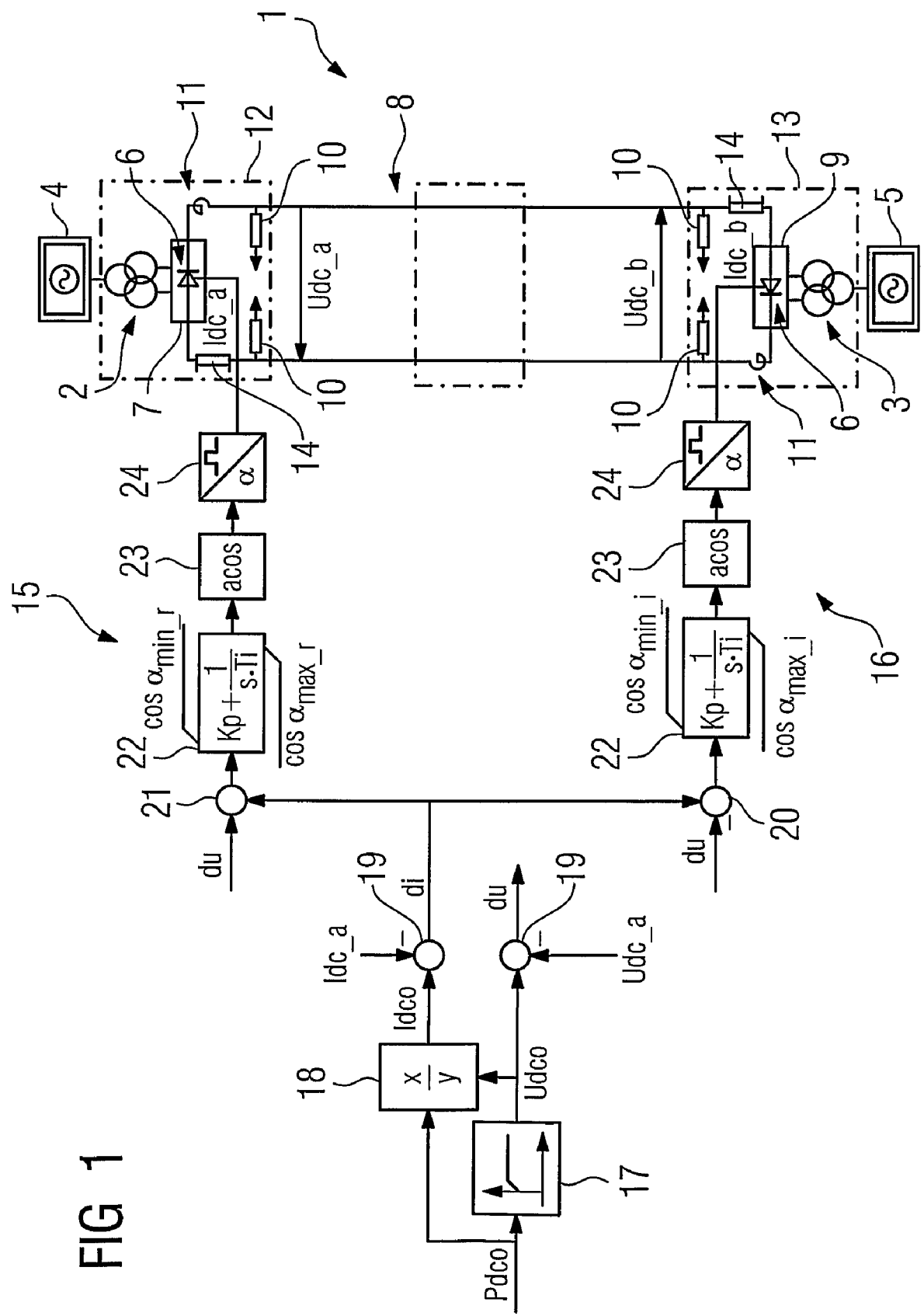
FIG. 1 schematically illustrates one exemplary embodiment of the method according to the invention.

FIG. 1 shows one exemplary embodiment of the method according to the invention in the form of a schematic illustration. This shows a high-voltage back-to-back link 1 which is intended to be controlled by the illustrated exemplary embodiment of the method according to the invention. The high-voltage back-to-back link 1 comprises a first power supply system connection transformer 2 and a second power supply system connection transformer 3, which are each intended for coupling the high-voltage back-to-back link 1 to the AC voltage power supply system 4 or 5, respectively. The first power supply system connection transformer 2 has a primary winding which is galvanically connected to the AC voltage power supply system 4 and is inductively connected to secondary windings on the power supply system connection transformer 2. The secondary windings on the power supply system connection transformers produce a different phase shift, thus resulting in a so-called 12-pulse high-voltage back-to-back link 1. 12-pulse high-voltage back-to-back links are very well known by those skilled in the art in this field, and they therefore do not need to be described in any more detail at this point.

The secondary windings of the power supply system connection transformers 2, 3 are each connected to a bridge circuit composed of thyristors 6, which are illustrated only schematically in FIG. 1. Bridge circuits such as these are likewise very well known. More detailed description is therefore likewise superfluous in this case. The bridge circuit composed of thyristors 6 in the exemplary embodiment illustrated in FIG. 1 is controlled so as to form a rectifier 7. The rectifier 7 is connected via a DC circuit 8 to an inverter 9, with the DC circuit 8 being grounded via resistors 10. Smoothing inductors 11 are provided in order to smooth the direct current, and are connected in the DC circuit 8. The converter 6 may, of course, also be operated as an inverter and the converter 9 as a rectifier.

The first power supply system connection transformer 2, the rectifier 7, one of the smoothing inductors 11 as well as the two resistors illustrated at the top in FIG. 1 are part of a rectifier station 12, which can also be referred to as a measurement point. A further measurement point is formed by an inverter station 13, in which the second power supply system connection transformer 3, the inverter 9, the smoothing inductor 11 and two resistors 10, which are illustrated at the bottom in FIG. 1, are arranged. Current transformers 14 are arranged in the rectifier station 12 and in the inverter station 13, and are designed to respectively record a direct current flowing in the rectifier station 12 and a direct current flowing in the inverter station 13. At their outputs, the current transformers 14 produce a signal which is proportional to the direct current flowing respectively in the rectifier station and in the inverter station 13. The direct current can be determined from the measured signal by using calibrated equipment. The measurement signal is sampled by means of a sampling unit in order to obtain sample values, and the sample values are digitized by an analog/digital converter, resulting in measured direct-current values, with the measured direct-current values being referred to as the measured direct current Idc_a. A measurement signal which is proportional to the DC voltage dropped across the rectifier station 12 is recorded on the resistors 10. This signal is also sampled and digitized, resulting in digital measured DC voltage values which are referred to here as the measured DC voltage Udc_a.

In the high-voltage back-to-back link 1, the rectifier 7 and the inverter 9 are positioned in the immediate vicinity of one another, so that the measured DC voltages Udc_a and Udc_b at the inverter station 13 and at the rectifier station 12 are essentially the same. In other words, the resistance of the DC circuit 8 between said measurement points can be ignored. This also applies to the respective measured direct currents Idc_a and Idc_b recorded respectively at the rectifier station 12 and at the inverter station 13. For this reason, the measured DC voltage Udc_a and the measured direct current Idc_a are transmitted both to a rectifier control system 15 and to an inverter control system 16. It is, of course, also possible to transmit only the measurement signals recorded by the transformers, with the sampling and digitizing being carried out respectively in the inverter control system 16 and in the rectifier control system 15.

The control for the high-voltage back-to-back link 1 therefore results in an expedient trigger angle both for the rectifier 7 and for the inverter 9. For this purpose, the operator presets a normalized nominal DC power Pdco as designed by him, normalized with respect to a likewise configurable rated DC power. The nominal DC power Pdco is supplied to a function transmitter 17 and to a divider 18, with the function transmitter 17 having a predetermined characteristic based on the design and configuration of a high-voltage back-to-back link 1, with this being used to define a nominal DC voltage Udco on the basis of the nominal DC power Pdco that has been selected. By means of the divider 18, the nominal DC power Pdco is divided by the nominal DC voltage Udco defined in this way to produce a nominal direct current Idco. The nominal DC voltage Udco and the nominal direct current Idco are each supplied to an adder 19, to whose negative input, which is provided with a minus sign, the recorded measured DC voltage Udc_a and the recorded measured direct current Idc_a are applied. In other words, each adder 19 respectively forms a difference direct current di and a difference DC voltage du. The difference direct current di is supplied to the positive input of an adder 20 and to the positive input of an adder 21. The difference DC voltage du is applied to a second positive input of the adder 21. In other words, the adder 21 forms the sum of the difference DC voltage du and the difference direct current di. At this point, it should be noted once again that the added values are, of course, normalized values. In other words, the measured DC voltage Udc_a is normalized with respect to a rated DC voltage UdcN, the measured direct current Idc_a is normalized with respect to a rated direct current IdcN and the nominal DC power Pdco is normalized with respect to a rated DC power PdcN.

The sum of the difference DC voltage du and the difference direct current di is supplied to a PI regulator 22 which, between the limit values $\cos \alpha_{max-r}$ and $\cos \alpha_{min-r}$, produces the cosine of a trigger angle $\alpha$ for the thyristors 6 in the rectifier 7. In this case, the thyristors 6 are triggered such that the sum of the difference DC voltage du and the difference direct current di is made as small as possible or, in other words, is made as close to zero as possible. The PI regulator 22 is followed by an arccos unit which uses the cosine of the trigger angle $\alpha$ to define the trigger angle $\alpha$ on the basis of the arccosine function, with a trigger pulse generator 24 triggering the appropriate thyristor in the rectifier 7 as a function of the synchronization voltage, which is governed by the power supply system but is not illustrated in the figures, and the trigger angle calculated by the arccos unit 23. The inverter control system 16 is designed in a manner corresponding largely to the rectifier control system 15, but with the PI regulator 22 in the inverter control system 16 defining a cosine of the trigger angle $\alpha$ between $\cos \alpha_{max-i}$ and $\cos \alpha_{min-i}$, such that the difference between the difference direct current and the difference DC voltage is minimized, or is as close to zero as possible. The arccos unit 23 in the inverter control system 16 defines a trigger angle $\alpha$ from the cosine of the trigger angle, with a trigger pulse generator 24 once again producing the trigger signals which are required to trigger the thyristors 6 in the inverter 9.

Figure 2:
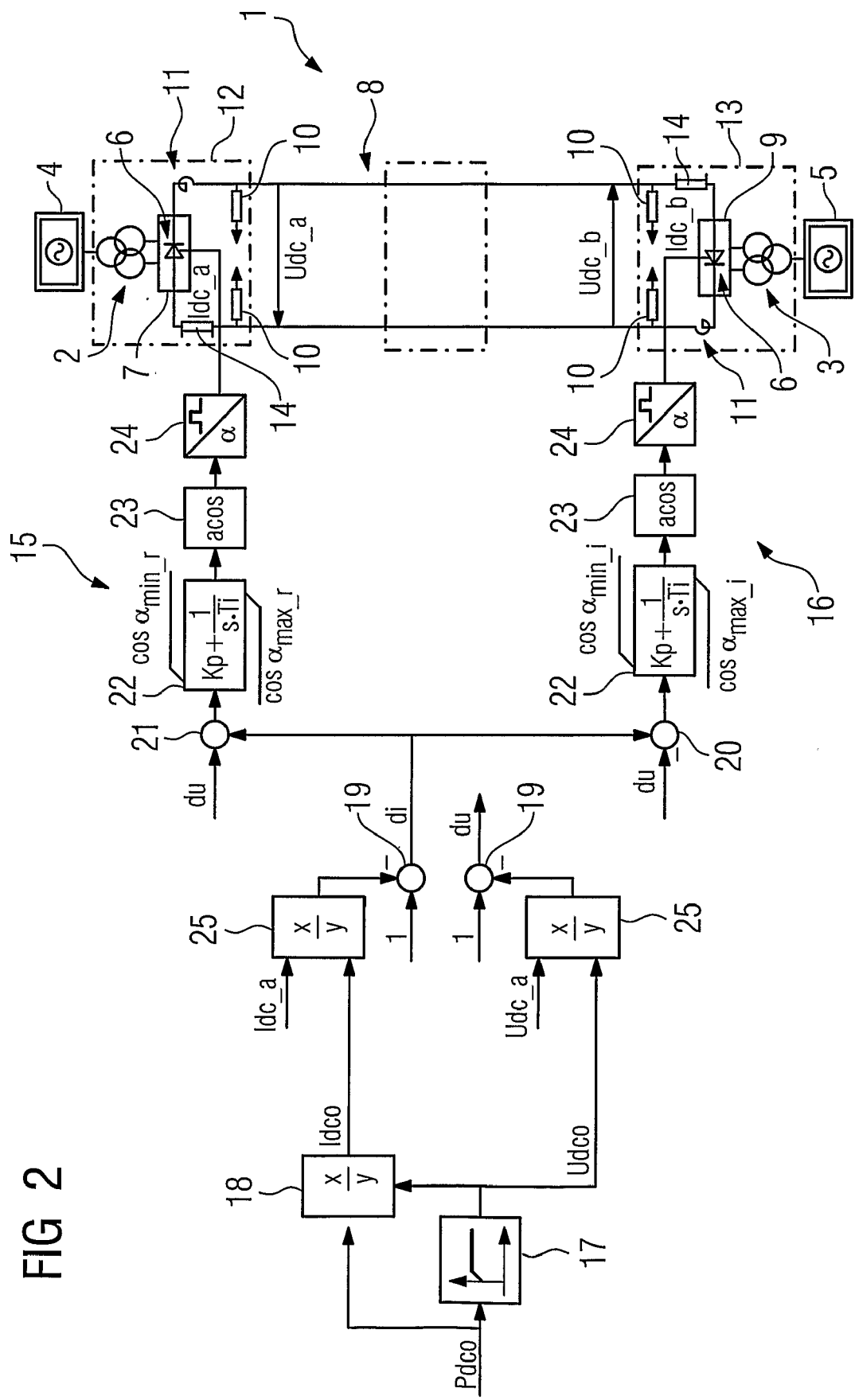
FIG. 2 shows a further development of the method shown in FIG. 1.

FIG. 2 illustrates a further exemplary embodiment of the method according to the invention. The illustrated exemplary embodiment corresponds very largely to the method illustrated in FIG. 1, but with a renormalization process, as has already been described above, being carried out in order to allow the control system for the high-voltage back-to-back link 1 to have a better response in the low-load range as well. First of all, a nominal DC voltage Udco is determined by means of the function transmitter 17 from the nominal DC power Pdco entered as a parameter by the operator, with a nominal direct current Idco being defined by means of the divider 18 and the nominal DC power Pdco. The nominal direct current Idco calculated in this way is then used for renormalizing the measured direct current Idc_a by means of the renormalizer 25, which can also be referred to as a divider. The renormalized measured direct current is subtracted from unity in order to calculate the difference direct current di. For this purpose, the output of the renormalizer 25 is connected to the negative input of an adder 19. The measured DC voltage Udc_a is renormalized in a corresponding manner by means of the renormalizer 25 illustrated at the bottom in FIG. 2. The output of the renormalizer 25, which is illustrated at the bottom in FIG. 2, is connected to the negative input of the adder 19, which subtracts the renormalized measured DC voltage from unity in order to calculate the difference DC voltage du. The difference DC voltage du calculated in this way and the difference direct current di calculated in this way are processed further as described in conjunction with FIG. 1.

Figure 3:
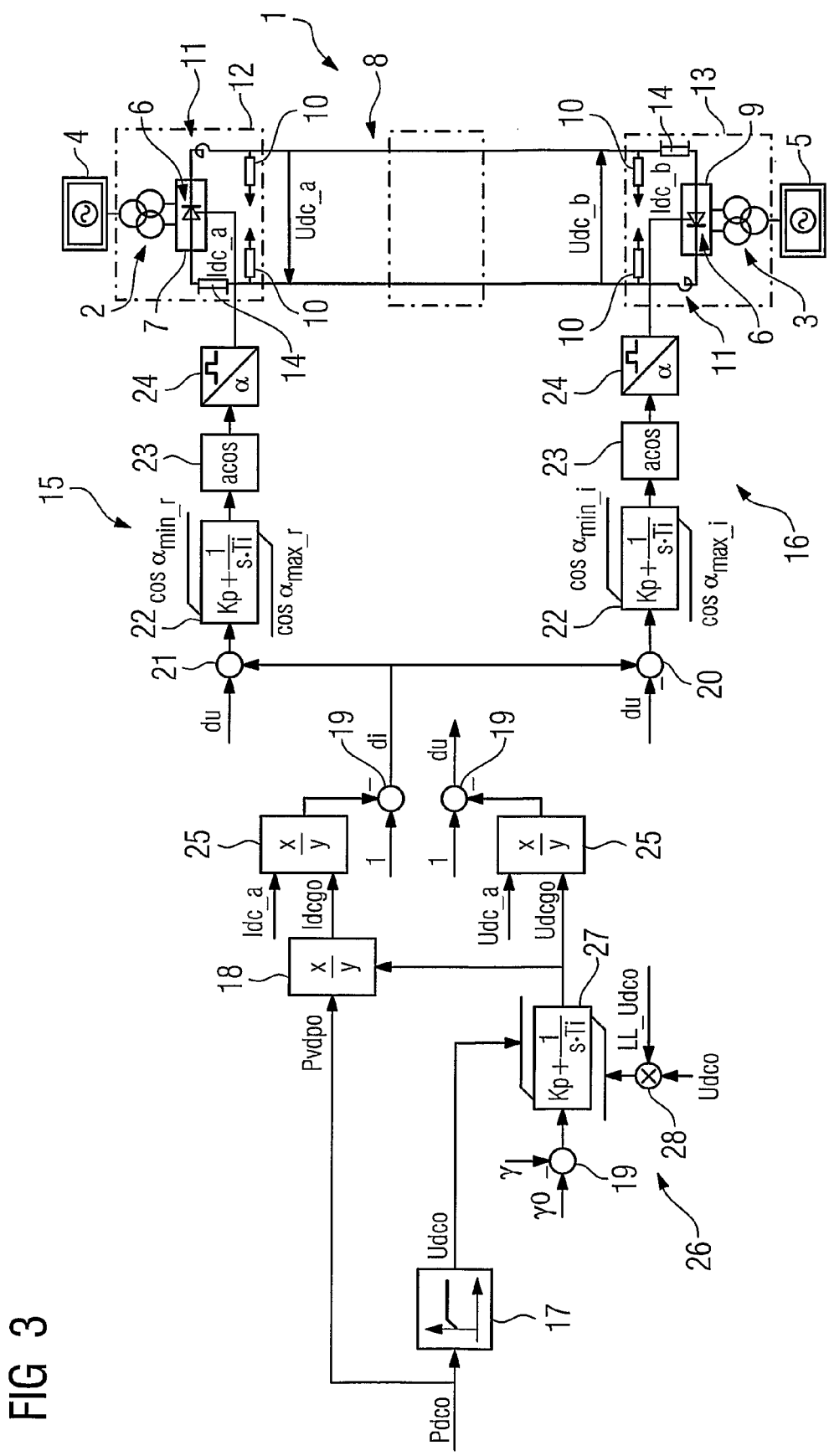
FIG. 3 shows a further development of the method shown in FIG. 2.

FIG. 3 illustrates a further exemplary embodiment of the invention, which corresponds essentially to the exemplary embodiment illustrated in FIG. 2. However, in contrast to the exemplary embodiment shown in FIG. 2, the inverter control system 16 has a gamma control system 26 which has means that are not illustrated in the figure in order to determine a measured turn-off angle γ for the inverter 9. Furthermore, a nominal turn-off angle $γ_0$ is provided and is applied to the negative input of an adder 19, that is to say in other words it is subtracted from the measured turn-off angle γ. The gamma control system 26 also has a gamma PI regulator 27 and a multiplier 28 in addition to the adder 19. The nominal DC voltage Udco calculated using the function transmitter 17 is used as an upper limit for the nominal voltage values produced by the gamma-PI regulator 27, with respect to which renormalization is carried out by means of the renormalizer 25. The lower limit is likewise defined on the basis of the nominal DC power Udco, with a previously entered parameter LL_Udco being multiplied by the nominal DC voltage Udco. In the exemplary embodiment mentioned above, the parameter LL_Udco is equal to 0.7, so that the gamma control system 26 is limited at the top to the nominal DC voltage Udco and at the bottom to 70% of the nominal DC voltage Udco. The gamma control system 26 makes it possible to avoid commutation faults resulting from the turn-off angle γ being too small. However, competitive control between gamma control systems and other types of control systems is avoided, so that predetermined operating points can be used deliberately.

Figure 4:
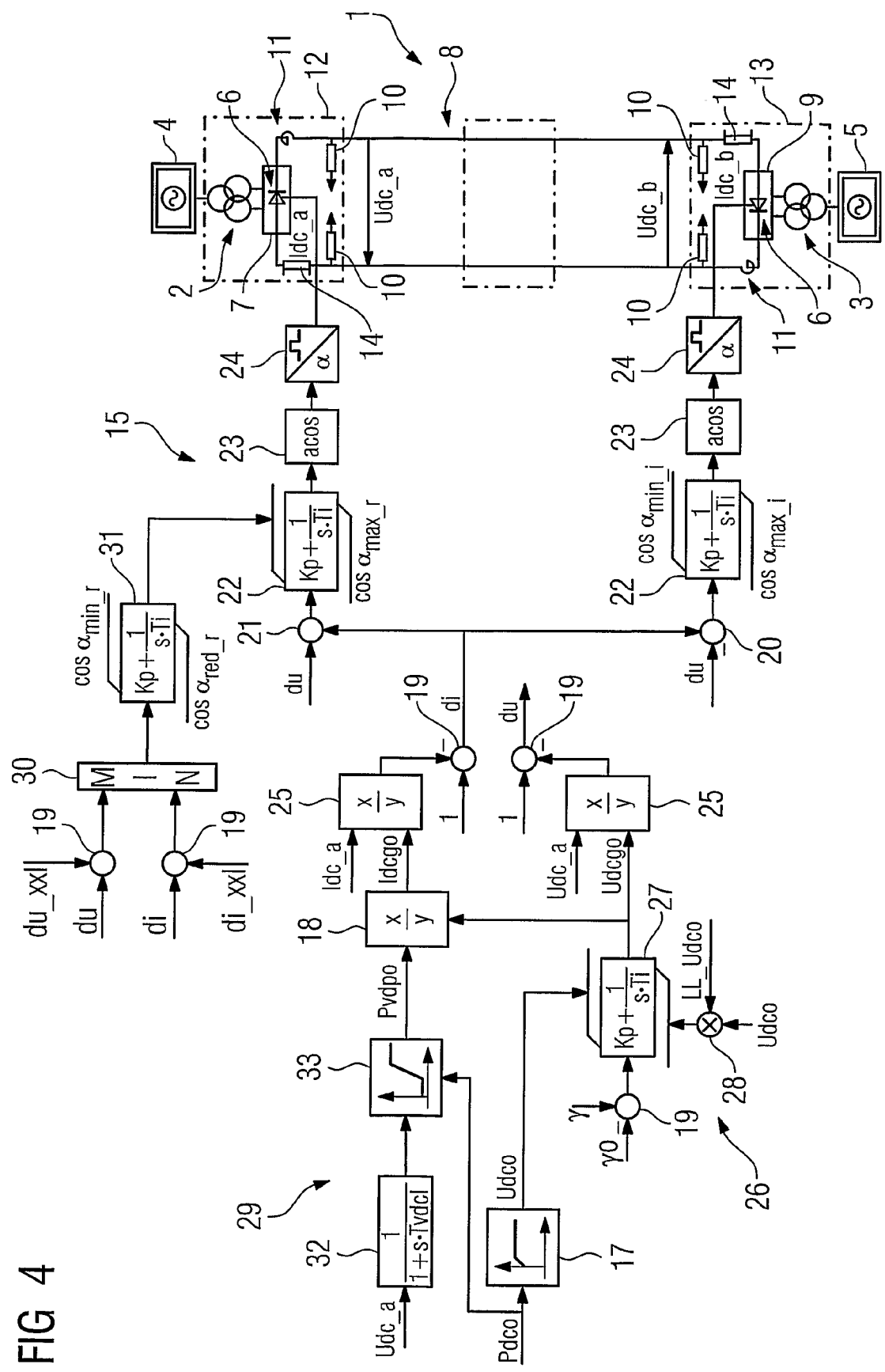
FIG. 4 shows a further development of the method shown in FIG. 3.

FIG. 4 illustrates a further exemplary embodiment of the method according to the invention, with the method illustrated in FIG. 4 corresponding very largely to the method illustrated in FIG. 3. However, the method shown in FIG. 4 results in an improvement in the response of the control process in the event of a voltage dip in one of the AC voltage power supply systems 4, 5 and/or in the event of a fault in the DC circuit.

The method illustrated carries out maximum-current limiting and/or maximum-voltage limiting. The two adders 19 and a minimum selection unit 30 as well as a pI regulator 31 are provided for this purpose. The pI regulator 31 operates via the upper limit of the rectifier regulator 22. The adders 19 add a maximum difference voltage discrepancy du_xxl and a maximum difference current discrepancy di_xxl of the difference DC voltage du and of the difference direct current di, respectively. If the measured direct current exceeds a resultant nominal current value, which is calculated from the sum of the nominal direct current Idco and the maximum difference current discrepancy di_xxl, the measured direct current is reduced to the resultant nominal current value by means of the pI regulator 31. The measured DC voltage is reduced to the resultant nominal voltage value in a corresponding manner. The greatest discrepancy is caused by the minimum selection unit 30. For this purpose, the output from the minimum selection unit 30 is supplied to a PI regulator 31 which produces at its output a cosine of a turn-off angle between cos $α_{red-r}$ and cos $α_{min-r}$. The output of the PI regulator 31 is used to limit the PI regulator 22 for the rectifier control system 15 at the top.

Typical values for du_xxl and di_xxl are between 0.01 and 0.1. The limit $α_{red-r}$ varies between 40° and 50°, depending on the performance of the high-voltage back-to-back link. The minimum turn-off angle for the rectifier $α_{min-r}$ is normally 5°.

The malfunction mechanism for the method according to the invention as described also includes a limiting device 29, which comprises a smoothing unit 32 and a function transmitter 33. The limiting device 29 decreases the originally required nominal DC power Pdco to Pvdpo as a function of the measured DC voltage Udc_a. Once the fault in the AC voltage power supply system 4 or 5 has been rectified, the DC voltage is first of all increased in the DC circuit 8, before increasing the nominal DC power to the original value Pdco. The interaction between the limiting unit 29 and the pI regulator 31 means that the AC voltage power supply systems 4 and 5 which are connected to the high-voltage back-to-back link 1 are not excessively loaded, even in the event of a relatively major voltage dip. Instead of this, operating points are used specifically and the response of the overall control system is improved, even in the event of a malfunction.

Figure 5:
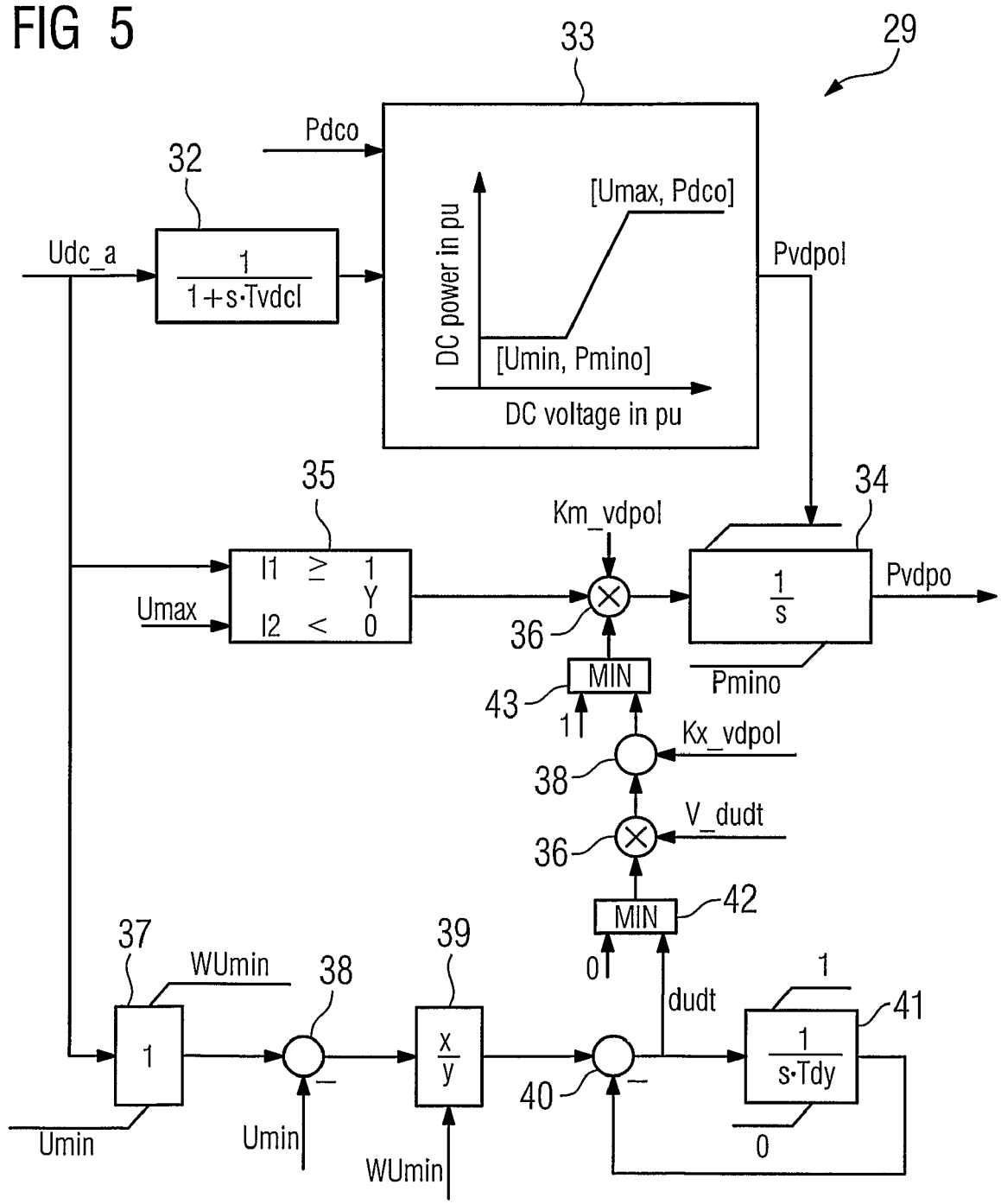
FIG. 5 shows a detail view of the further development shown in FIG. 4.

FIG. 5 shows the effect of the limiting unit 29 in more detail. The measured DC voltage Udc_a is thus supplied to the smoothing unit 32 in order to smooth the voltage fluctuations which occur frequently in the event of a voltage dip in one of the AC voltage power supply systems 4 or 5 or in the event of some other malfunction, and therefore to convert them to measured DC voltages Udc_a which can be processed. The smoothed measured DC voltage is supplied together with the normalized nominal DC power Pdco to the function transmitter 33. At its output, the function transmitter 33 produces a normalized malfunction power limit Pvdpol using a characteristic which is based on the experience of the designer of the high-voltage direct-current installation. If the smoothed measured DC voltage Udc_a exceeds a maximum DC voltage Umax as a threshold value, the function transmitter 33 produces, at its output, the nominal DC power Pdco applied to its input.

The output of the function transmitter 33 is used for maximum limiting for an integrator 34, with the minimum output voltage of the integrator 34 being Pmino. Furthermore, a limit-value signaling device 35 is provided, and has two inputs. The measured DC voltage Udc_a is applied to the first input of the limit-value signaling device 35. The maximum voltage Umax is fed from the function transmitter 33 to the second input. The limit-value signaling device compares the two input values. If the measured DC voltage Udc_a is greater than the maximum voltage Umax, as is normally the case during rated operation, the output Y of the limit-value signaling device 35 is set to be equal to unity. If the measured DC voltage falls below the maximum voltage Umax, the output of the limit-value signaling device is, in contrast, equal to zero. In the event of a malfunction, the multiplier 36 is therefore provided with a zero as a factor, so that the integrator 34 produces values Pvdpo between the minimum power Pmino and the maximum power Pdco at its output, depending on the drop in the measured DC voltage.

As can be seen from FIG. 4, the difference direct current is in this case determined on the basis of Pvdpo.

Once the fault has been rectified, the measured DC voltage Udc_a rises. This leads to an increase in Pvdpol on the basis of the characteristic of the function transmitter 33, at its output. However, the output of the integrator is initially locked at the lowest value Pvdpo which was used during the malfunction. However, if the comparator 35 signaled that the measured DC voltage Udc_a has exceeded a threshold value Umax, the integrator 34 integrates to the value Pvdpol produced by the function transmitter 33. Finally, Pdpo, Pvdpol and Pdco match one another, so that a change is made to normal operation.

The other components shown in FIG. 5 are used to vary the integration rate of the integrator 34 from Pmino until the nominal DC power Pdco is reached. A limiter 37 is first of all provided in order to define the integration weight, and checks whether the measured DC voltage Udc_a is in the range between Umin and WUmin. If Udc_a is below Umin, Umin is produced at the output of the comparator 37, so that a zero signal is produced at the output of the downstream adder 38, to whose negative input Umin is applied. The divider 39 therefore likewise produces a zero signal at its output, from which previous voltage values are subtracted by means of the adder 40. The previous voltage values between 0 and 1 are produced by the smoothing unit 41, and are likewise zero in the described situation.

If, in contrast, the measured DC voltage Udc_a is between the limits Umin and WUmin, a difference voltage normalized with respect to WUmin is therefore produced at the output of the divider 39. Previous smoothed voltage values are subtracted from this by means of the adder 40. The value dudt produced at the output of the adder 40 may be positive or negative depending on whether the measured DC voltage Udc_a is rising or falling. The subsequent minimum selection 42 ensures that only negative dudt values are passed on from the minimum selection 42. If the voltage rises, the product dudt is positive and the minimum selection 42 passes a zero to the multiplier 36, which multiplies this by the predetermined parameter V_dudt, and passes the resultant product, in this case likewise zero, to the adder 38 which then adds this to the likewise predetermined parameter Kx_vdpol. The value Kx_vdpol is equal to or greater than unity. In the event of a falling voltage, the minimum selection 43 therefore ensures that a value equal to unity is passed to the multiplier 36, which multiplies this value of unity by the output from the limit-value signaling device 35 and the parameter Km_vdpol which can likewise be preset, and finally makes this available to the integrator 34. The product Y×km_vdpol×1 is equal to Km_vdpol. The integrator 34 integrates at a selective standard rate.

If the measured DC voltage falls during the integration process because of a fault or because of a weak power supply system, dudt in contrast is negative. The dudt value is passed on, is multiplied by V-dudt and is finally added to Kx_vdpol by means of the adder so that a value of less than unity is produced at the output of the adder 38, and is finally passed to the multiplier 36. The integrator 34 therefore uses the new time constant to increase the nominal power Pvdpo produced at its output, more slowly.

FIG. 6 illustrates one exemplary embodiment of the method according to the invention for controlling a so-called high-voltage direct-current long-distance transmission installation 44. A high-voltage direct-current long-distance transmission installation 44 such as this designed for long-distance transmission systems essentially comprises the same components as the high-voltage back-to-back link shown in FIG. 1. However, the rectifier 7 and the inverter 9 are located more than 600 km apart from one another in the illustrated exemplary embodiment. The DC circuit 8 is therefore provided by a DC cable link with a length of about 600 km. Because of this long distance, the measured DC voltage and the measured direct current are recorded on the one hand at the rectifier station 12 as one measurement point and on the other hand at the rectifier station 13 as a measurement point, with the measured values recorded at or in the vicinity of the rectifier station 12 being supplied to the rectifier control system 15, and with the measured values recorded at or in the vicinity of the inverter station being supplied to the inverter control system 16. In the illustrated exemplary embodiment, the nominal DC voltage Pdco in the inverter control system 16 is determined in accordance with the respective requirements of the operator and is sent by means of an expedient long-distance data transmission radio transmitter 45 to a long-distance data transmission radio receiver 46 that has been adapted for this purpose. As explained in conjunction with FIGS. 1 to 4, the function transmitter 17 determines a nominal DC voltage Udco from the nominal DC power Pdco. This is used as the maximum limit by the gamma-PI regulator 27 which, in the illustrated exemplary embodiment, is a component of the inverter control system 16. The rectifier control system 15 may, of course, also have a gamma control system 26 such as this, so that the power flow can take place in both directions, as required. The output voltage Udcgo produced by the gamma-PI regulator 27 in the gamma control system 26 is then transmitted to the rectifier control system 15 by means of the long-distance data transmission transmitter 45, with the rectifier control system receiving the standard voltage by means of an expedient long-distance data transmission receiver 46. The rest of the control steps correspond to those which have already been described in conjunction with the high-voltage back-to-back link illustrated in FIGS. 1 to 5. The limiting unit 29 may be used both for the rectifier control system 15 and for the inverter control system. The pI regulator 31 for maximum limiting of the pI regulator 22 in the rectifier control system 15 is, in contrast, generally provided only for the rectifier control system.

The invention claimed is:

1. A method for controlling a rectifier and an inverter being connected to one another via a DC circuit, in a field of power distribution and transmission, which comprises the steps of:
    measuring a measured DC voltage and a measured direct current at least one measurement point in the DC circuit;
    forwarding the measured DC voltage and the measured direct current to at least one of a rectifier control system for controlling the rectifier and an inverter control system for controlling the inverter;
    the rectifier control system and the inverter control system each determining a difference between a predetermined nominal DC voltage and the measured DC voltage received, resulting in a difference DC voltage and, furthermore, determining a difference between a nominal direct current and the measured direct current received resulting in a difference direct current, with the difference DC voltage and the difference direct current being in a normalized form;
    controlling, via the rectifier control system, the rectifier such that a sum of the difference DC voltage and the difference direct current is minimized;
    controlling, via the inverter control system, the inverter such that the difference between the difference direct current and the difference DC voltage is minimized; and
    setting the nominal direct current through the rectifier control system and the nominal direct current through the inverter control system to be identical.

2. The method according to claim 1, which further comprises setting the predetermined nominal DC voltage in the rectifier control system and the predetermined nominal DC voltage in the inverter control system to be identical.

3. The method according to claim 1, which further comprises controlling the rectifier and the inverter over an entire operating range of the rectifier and of the inverter, respectively, both on a basis of the difference direct current and on the basis of the difference DC voltage.

4. The method according to claim 1, which further comprises:

installing physically the rectifier and the inverter alongside one another forming a back-to-back link; and recording the measured DC voltage and the measured direct current at the measurement point and being transmitted both to the rectifier control system and to the inverter control system.

5. The method according to claim 1, which further comprises:

installing the rectifier and the inverter at least one kilometer away from one another forming a direct-current transmission installation;

recording the measured DC voltage and the measured direct current at the rectifier, resulting in a rectifier measured DC voltage and a rectifier measured direct current;

recording the measured DC voltage and the measured direct current at the inverter, resulting in an inverter measured DC voltage and an inverter measured direct current;

transmitting the rectifier measured DC voltage and the rectifier measured direct current to the rectifier control system; and transmitting the inverter measured DC voltage and the inverter measured direct current to the inverter control system.

6. The method according to claim 1, which further comprises determining the predetermined nominal DC voltage and the nominal direct current from a required nominal DC power.

7. The method according to claim 1, wherein the measured direct current, normalized with respect to a rated current, and the measured DC voltage, normalized with respect to a rated voltage, are renormalized with respect to the nominal direct current, likewise normalized with respect to the rated current, and, respectively, with respect to the nominal DC voltage, likewise normalized with respect to the rated voltage, with the difference direct current being calculated as a difference between unity and the measured direct current normalized with respect to the nominal direct current, and with the difference DC voltage being calculated as a difference between unity and the measured DC voltage normalized with respect to the nominal DC voltage.

8. The method according to claim 1, which further comprises:

measuring a measured turn-off angle at the inverter;

transmitting the measured turn-off angle to a gamma control system;

comparing, via the gamma control system, the measured turn-off angle with a nominal turn-off angle; and producing a DC voltage nominal value being lower than the predetermined nominal DC voltage if the measured turn-off angle is less than the nominal turn-off angle and, with the inverter control system then regulating at the DC voltage nominal value.

9. The method according to claim 1, which further comprises using a limiting regulator for limiting a rectifier regulator in the rectifier control system at a top, such that at least one of a predetermined maximum current and a predetermined maximum voltage are not exceeded.

10. The method according to claim 9, which further comprises limiting, via the limiting regulator, the rectifier regulator when one of:

the measured direct current is greater than a sum of the nominal direct current and a predetermined difference direct-current discrepancy; and the measured DC voltage is greater than a sum of the nominal DC voltage and a predetermined difference DC voltage discrepancy.

11. The method according to claim 1, which further comprises when the measured DC voltage is falling, reducing a nominal DC power in dependence on the measured DC voltage to a lower value for producing a malfunction nominal DC power, with at least one of the nominal direct current and the predetermined nominal DC voltage being determined from the malfunction nominal DC power rather than from the nominal DC power.

* * * * *